United States Patent
Andorko et al.

(10) Patent No.: US 9,940,519 B2
(45) Date of Patent: Apr. 10, 2018

(54) IMAGE PROCESSING METHOD AND SYSTEM FOR IRIS RECOGNITION

(71) Applicant: FotoNation Limited, Galway (IE)

(72) Inventors: Istvan Andorko, Galway (IE); Alexandru Drimbarean, Galway (IE); Peter Corcoran, Claregalway (IE)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 15/192,186

(22) Filed: Jun. 24, 2016

(65) Prior Publication Data
US 2017/0372136 A1    Dec. 28, 2017

(51) Int. Cl.
G06K 9/00 (2006.01)
G06T 7/00 (2017.01)
G06K 9/46 (2006.01)
H04N 5/33 (2006.01)

(52) U.S. Cl.
CPC ....... *G06K 9/00617* (2013.01); *G06K 9/4604* (2013.01); *G06T 7/0044* (2013.01); *G06T 7/0081* (2013.01); *H04N 5/33* (2013.01)

(58) Field of Classification Search
CPC ............. G06K 9/00617; G06K 9/4604; G06K 9/00597; G06K 9/0061; G06K 9/00604; G06F 21/32; G06T 7/337; G06T 7/0044; G06T 7/0081; H04N 5/33
See application file for complete search history.

(56) References Cited

U.S. PATENT DOCUMENTS

| 9,058,765 B1* | 6/2015 | Mallick | G06F 3/0482 |
| 2012/0199653 A1* | 8/2012 | Wenzel | G07C 9/00103 235/382 |
| 2015/0098630 A1* | 4/2015 | Perna | G06K 9/00604 382/117 |
| 2015/0304535 A1* | 10/2015 | Smits | G06T 7/90 348/78 |

FOREIGN PATENT DOCUMENTS

| WO | WO2007106117 | 9/2007 |
| WO | WO2014020147 | 2/2008 |

OTHER PUBLICATIONS

Daugman, "New Methods in Iris Recognition", IEEE Tranactions on Systems, Man, and Cybernectics IEEE , Part B, col. 37, No. 5.

* cited by examiner

*Primary Examiner* — Ali Bayat

(57) ABSTRACT

An image processing method for iris recognition of a predetermined subject, comprises acquiring through an image sensor, a probe image illuminated by an infra-red (IR) illumination source, wherein the probe image comprises one or more eye regions and is overexposed until skin portions of the image are saturated. One or more iris regions are identified within the one or more eye regions of said probe image; and the identified iris regions are analysed to detect whether they belong to the predetermined subject.

19 Claims, 5 Drawing Sheets

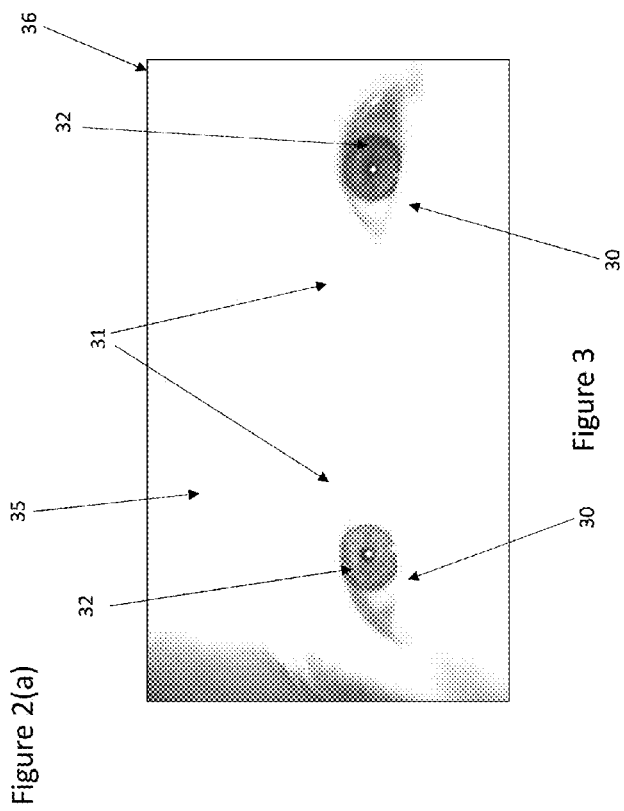
Figure 3
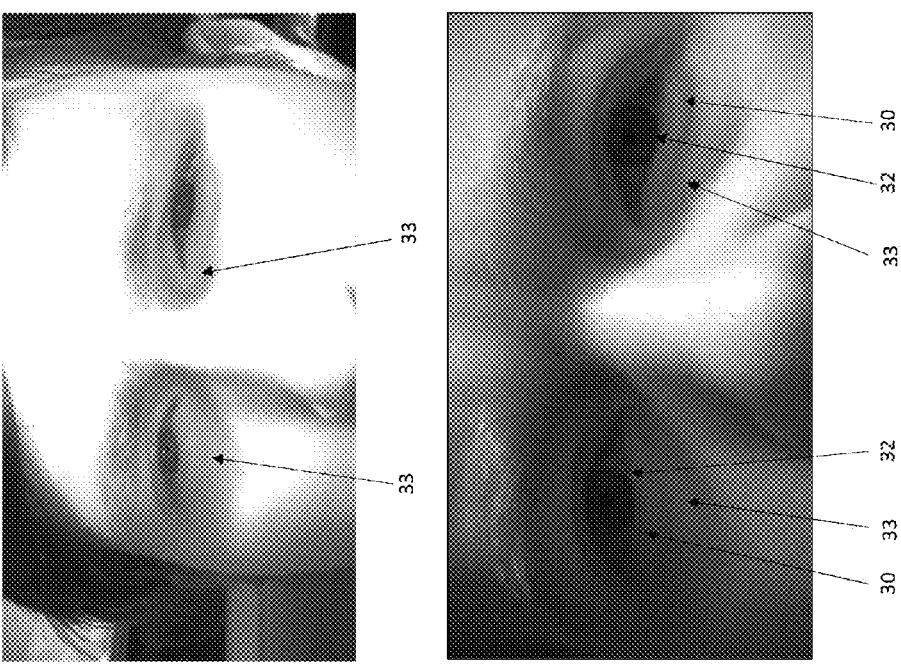
Figure 2(a)
Figure 2(b)

IMAGE PROCESSING METHOD AND SYSTEM FOR IRIS RECOGNITION

FIELD

The present invention relates to an image processing method and system for iris recognition.

BACKGROUND

The iris surrounds the dark, inner pupil region of an eye and extends concentrically to the white sclera of the eye.

A. K. Jain, A. Ross, and S. Prabhakar, "An introduction to biometric recognition," IEEE Trans. Circuits Syst. Video Technol., vol. 14, 2004 discloses that the iris of the eye is a near-ideal biometric.

For the purposes of recognition, an image of an iris region is typically acquired in an imaging system that uses infra-red (IR) illumination to bring out the main features of an underlying iris pattern. An iris pattern is a gray-scale/luminance pattern evident within an iris region that can be processed to yield an iris code. The iris pattern can be defined in terms of polar co-ordinates and these are typically converted into rectangular coordinates prior to analysis to extract the underlying iris code.

Strong sunlight can affect the performance of iris recognition systems because of shadows on a subject's face and/or light patterns being reflected from the iris, causing a significant performance degradation.

Further, it is known that substitute images containing iris regions of a person to be recognized, such as images shown in pictures, artificial objects, or monitors, can be presented to an iris recognition system, instead of the person themselves, for fraudulent purposes—this is commonly referred to as spoofing.

SUMMARY

According to a first aspect of the present invention there is provided an image processing method for iris recognition according to claim 1.

According to a second aspect there is provided an image processing method for liveness iris recognition according to claim 17.

There is also provided an image processing system for iris recognition according to claim 18 and a computer program product according to claim 19.

Embodiments are based on the observation that IR light is reflected in a different way from the human eye than from the skin of the face of a living subject. The difference in reflection is such that eye regions within an image are still detectable when the image skin portions saturate.

The fact that iris regions can be detected in an image overexposed so that skin portions are saturated indicates the liveness of a subject under recognition, and hence the method can proceed with the authentication of the live subject. In this way, embodiments are not only improved in view of possible strong sunlight conditions, but also provide robust liveness detection.

In particular, as long as exposure time is not too long (and this is usually possible in strong sunlight conditions) iris details can be more readily detected within an overexposed image compared to performing image acquisition with a normally exposed image where it is not desirable to saturate large portions of an image or indeed to expose the image for long enough to do so.

Hence, acquiring an iris region during an enrolment stage from an overexposed reference image and using it in the following authentication stage improves the accuracy and reliability of the whole iris recognition process, especially in case of strong sunlight.

According to one embodiment, authentication can switch between two working modes: a normal light mode for standard operation with normal light conditions, and a strong light mode for working with images affected by strong ambient light conditions.

Accordingly, the enrolment stage of the iris recognition may comprise acquiring a normally-exposed reference image and an overexposed reference image, and generating and storing information from the iris regions of these reference images.

During the authentication stage of the process, if ambient light does not exceed a threshold, the process can run in a substantially standard mode, where the iris regions of a normally-exposed probe image can be compared for matching purposes with the stored information for the iris regions from the normally-exposed reference image.

Otherwise, the process can switch to a strong light mode, where the iris regions of an overexposed probe image recognition can be compared for matching purposes with the stored information for the iris regions from the overexposed reference image.

Acquiring an iris region during the enrolment stage from an overexposed reference image and using it in the following authentication stage further improve the accuracy and reliability of the iris recognition process working in the strong light mode.

BRIEF DESCRIPTION OF THE DRAWINGS

Embodiments of the invention will now be described, by way of example, with reference to the accompanying drawings, in which:

FIGS. 2(*a*) and 2(*b*) illustrate normally-exposed NIR face images affected by strong sunlight;

FIG. 3 illustrates an overexposed version of the NIR face image of FIG. 2(*b*);

DETAILED DESCRIPTION

Figure 1:
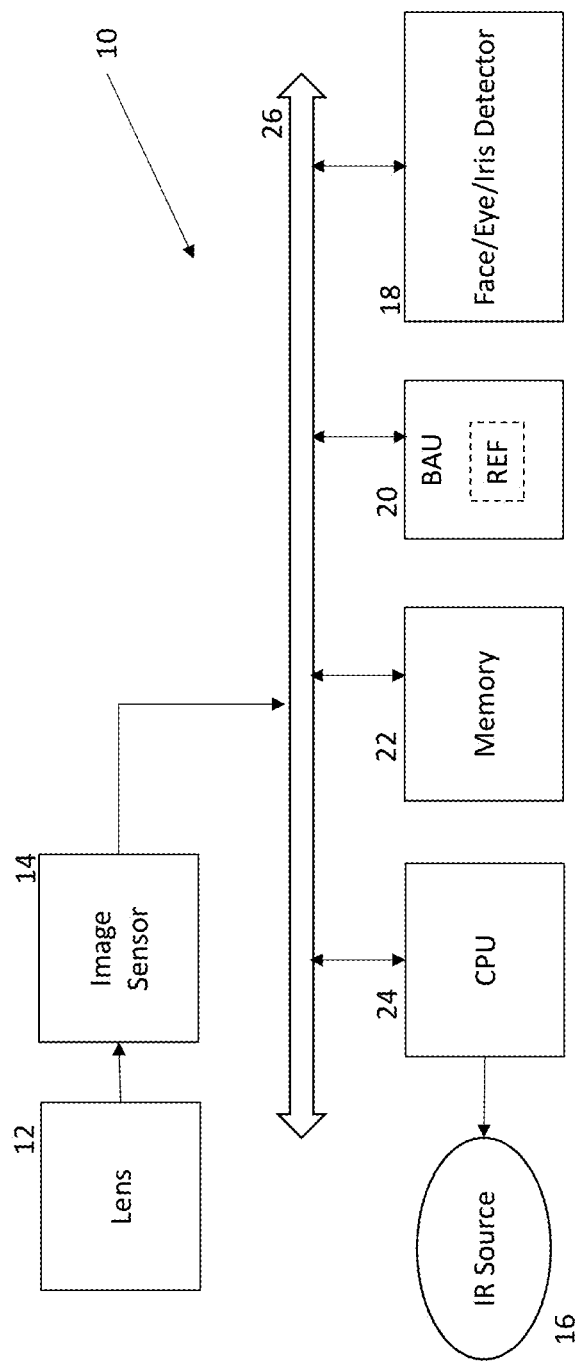
FIG. 1 schematically illustrates an exemplary image processing system according to an embodiment of the present invention.

Referring now to FIG. 1 there is shown an image processing system 10 for performing iris recognition according to an embodiment of the present invention.

The system 10, which may comprise for example, a camera, a smartphone, a tablet or the like, comprises a central processing unit (CPU) 24 which typically runs operating system software as well as general purpose application software, for example, camera applications, browser, messaging, e-mail or other apps. The operating system may be set so that a user must authenticate themselves to unlock the system and to gain access to applications installed on the system; or individual applications running on the system may require a user to authenticate themselves before they gain access to sensitive information.

The system 10 comprises a lens assembly 12, an image sensor 14, and at least one IR illumination source 16 capable of acquiring an image, such as a facial image of a predetermined subject to be recognized and authenticated by the system 10.

The IR illumination source 16, which can for example be a NIR LED, is configured to illuminate a subject with IR light, preferably NIR light (that is light of approximately 700-1000 nm in wavelength). One suitable LED comprises an 810 nm SFH 4780S LED from OSRAM. In some embodiments more than one illumination source or a tunable illumination source may be employed to emit IR light at different wavelengths.

The lens 12 is configured for focusing IR light reflected from an illuminated subject onto the sensor 14.

A first exemplary lens assembly 12 is disclosed in WO/2016/020147 (Ref: FN-397), the disclosure of which is incorporated herein by reference, which comprises a plurality of lens elements arranged to simultaneously focus NIR light received from a given object through central and peripheral apertures of a filter, and visible light received from the object through the central aperture onto the sensor surface.

A second exemplary lens assembly 12 is disclosed in PCT/EP2016/052395 (Ref: FN-452), the disclosure of which is incorporated herein by reference, which comprises a collecting lens surface with an optical axis and which is arranged to focus IR light received from a given object distance on the image sensor surface. The lens assembly includes at least a first reflective surface for reflecting collected light along an axis transverse to the optical axis, so that a length of the optical system along the optical axis is reduced by comparison to a focal length of the lens assembly.

A third exemplary lens assembly 12 is disclosed in PCT/EP2016/060941 (Ref: FN-466), the disclosure of which is incorporated herein by reference, which comprises a cluster of at least two lenses arranged in front of the image sensor with each lens' optical axis in parallel spaced apart relationship. Each lens has a fixed focus and a different aperture to provide a respective angular field of view. The lens with the closest focus has the smallest aperture and the lens with the farthest focus has the largest aperture, so that iris images can be acquired from subjects at distances from between about 200 mm to 500 mm from an acquisition device.

A fourth exemplary lens assembly 12 is disclosed in U.S. patent application Ser. No. 15/186,283 filed 17 Jun. 2016 (Ref: FN-477), the disclosure of which is incorporated herein by reference, which comprises an image sensor comprising an array of pixels including pixels sensitive to NIR wavelengths; at least one NIR light source capable of selectively emitting light with different discrete NIR wavelengths; and a processor, operably connected to the image sensor and the at least one NIR light source, to acquire image information from the sensor under illumination at one of the different discrete NIR wavelengths. A lens assembly comprises a plurality of lens elements with a total track length no more than 4.7 mm, each lens element comprising a material with a refractive index inversely proportional to wavelength. The different discrete NIR wavelengths are matched with the refractive index of the material for the lens elements to balance axial image shift induced by a change in object distance with axial image shift due to change in illumination wavelength.

Other variants of these lens assemblies are of course possible.

Preferably, the sensor 14 comprises an array of pixels including pixels sensitive to IR wavelengths. For example, the sensor 14 may comprise either a dedicated IR image sensor, a conventional type RGB type array, where the natural IR sensitivity of the RGB pixels is used to acquire both visible wavelength images as well as images illuminated with the IR illumination source 16. Alternatively, the sensor 14 may comprise an RGBW (where the white pixels are also IR sensitive) or RGB-IR array (including IR only sensitive pixels) where visible and IR images of a scene can be acquired substantially simultaneously.

Typically, images acquired from the image sensor 14 are written into memory 22 as required either by applications being executed by the CPU 24 or other dedicated processing blocks which have access to the image sensor 14 and/or memory 22 across the system bus 26.

In the embodiment, the system 10 further comprises a dedicated face/eye/iris detector 18 for identifying a face region within an acquired image, and within a given face region, one or more eye regions and iris regions within those eye regions. This functionality could equally be implemented in software executed by the CPU 24.

Face detection in real-time has become a standard feature of most digital imaging devices and there are many techniques for identifying such regions within an acquired image, for example, as disclosed in WO2008/018887 (Reference: FN-143), the disclosure of which is incorporated herein by reference. Further, most cameras and smartphones also support the real-time detection of various facial features and can identify specific patterns such as 'eye-blink' and 'smile' so that for example, the timing of main image acquisition can be adjusted to ensure subjects within a scene are in-focus, not blinking or are smiling such as disclosed in WO2007/106117 (Reference: FN-149), the disclosure of which is incorporated herein by reference. Where such functionality is available in an image processing device, detecting and tracking face regions and eye regions within those face regions imposes no additional overhead and so this information is available continuously for a stream of images being acquired by the system 10.

The iris regions are extracted from the identified eye regions and a more detailed analysis may be performed to confirm if a valid iris pattern is detectable. J. Daugman, "New methods in iris recognition," IEEE Trans. Syst. Man. Cybern. B. Cybern., vol. 37, pp. 1167-1175, 2007 discloses a range of additional refinements which can be utilized to determine the exact shape of iris and the eye-pupil. It is also common practice to transform the iris from a polar to rectangular co-ordinate system, although this is not necessary.

Hence, the output of the detector 18 comprises one or more iris regions identified within an acquired image.

The data for the identified one or more iris regions may be stored in the system memory 22 and/or other memories such as secure memory or databases belonging to or separate from the system 10.

Iris regions identified within an acquired image can be used as an input for a biometric authentication unit (BAU) 20. The BAU 20 is configured for analyzing the received iris regions in order to detect whether they belong to a predetermined subject.

Preferably, the BAU 20 is configured for extracting an iris code from the received iris regions, and it may store this code in the memory 22 and/or other memories or databases belonging to or separate from the system 10.

Further, the BAU 20 is preferably configured to compare the received one or more iris regions with reference iris region(s) associated to the predetermined subject, which can be stored in memory 22, within secure memory in the BAU 20 or in any location accessible to the BAU 20.

An exemplary way for performing iris code extraction and comparison between iris regions is disclosed in WO2011/124512 (Reference: FN-458), the disclosure of which is incorporated herein by reference, and this involves a comparison between two image templates using a master mask to select corresponding codes from the templates. The master mask excludes blocks from the matching process and/or weights blocks according to their known or expected reliability.

Figure 6:
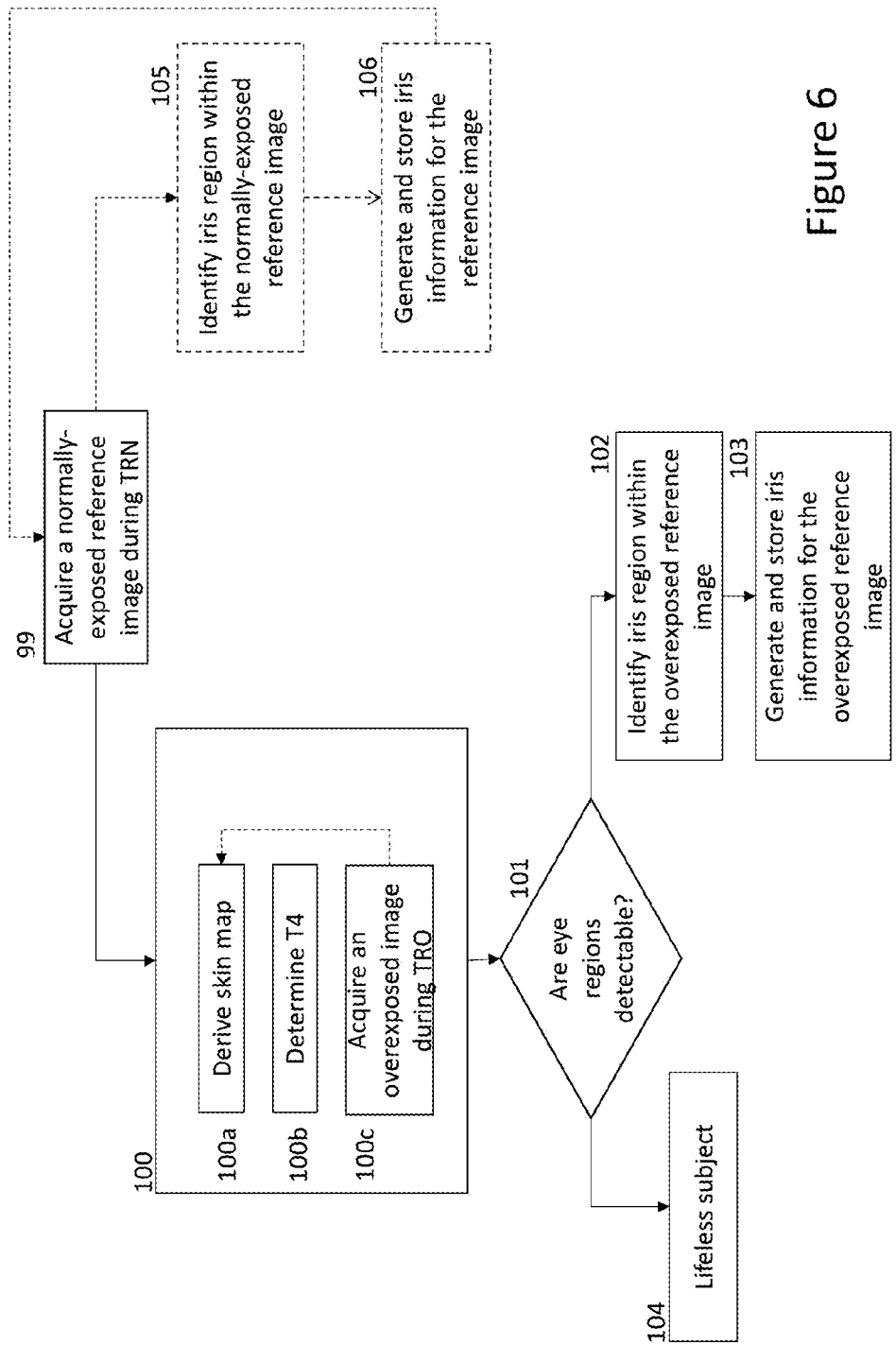
FIGS. 6 and 7 illustrate an enrolment stage and an authentication stage, respectively, of an exemplary method.
Figure 7:
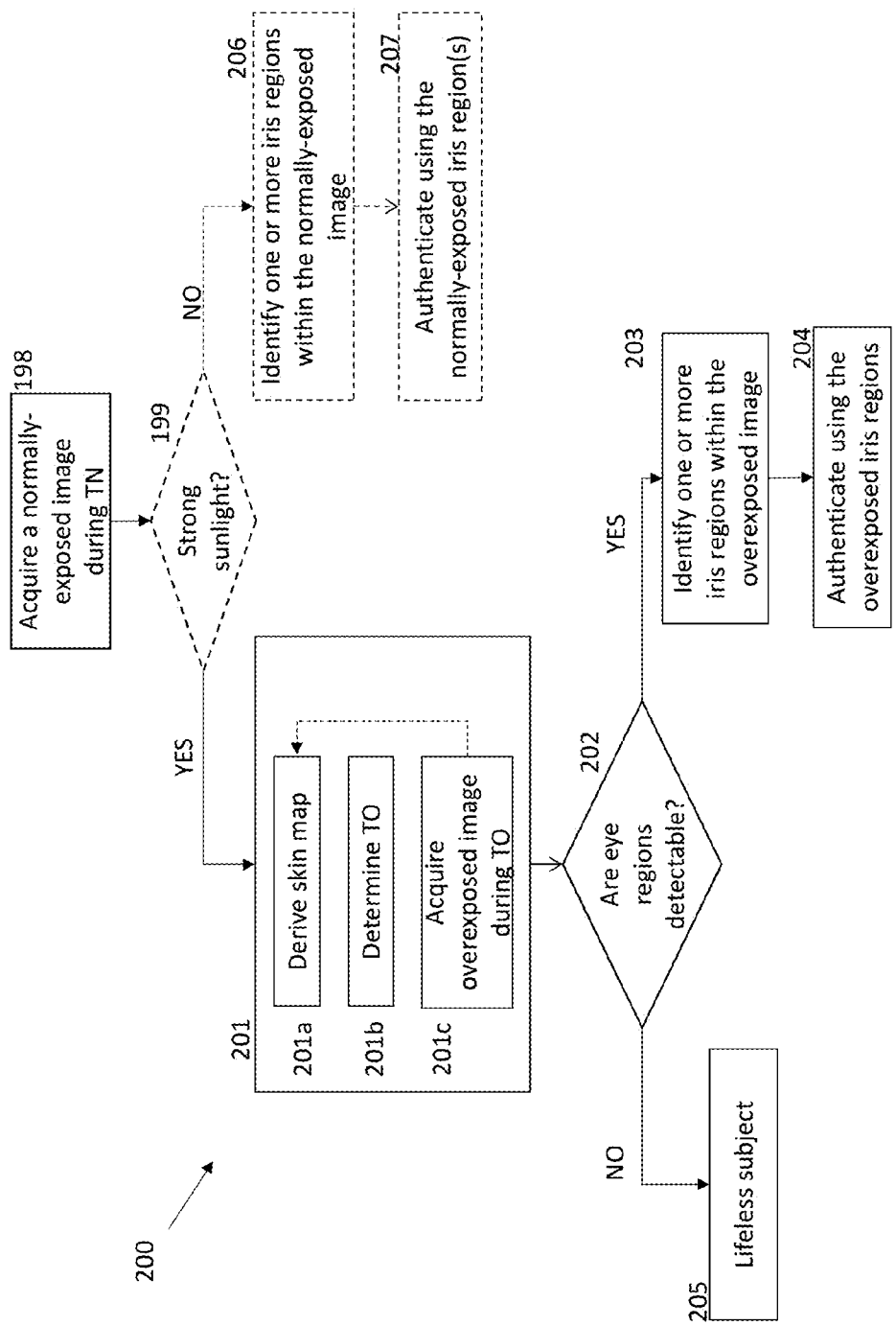

Referring now to FIGS. 6 and 7, the system of the embodiment operates in two-stages, an enrollment stage illustrated in FIG. 6 and an authentication stage illustrated in FIG. 7. Each stage can be implemented with either operating system software or application software or within a dedicated hardware module such as a modified BAU 20. Where the stage is driven by software running on the CPU, the software can utilize the functionality of dedicated processing modules such as the BAU 20 or detector 18 through their respective APIs.

In any case, the enrollment stage begins when a user indicates that they wish to either secure the entire system or a given application running on the system based on iris recognition.

Figure 4:
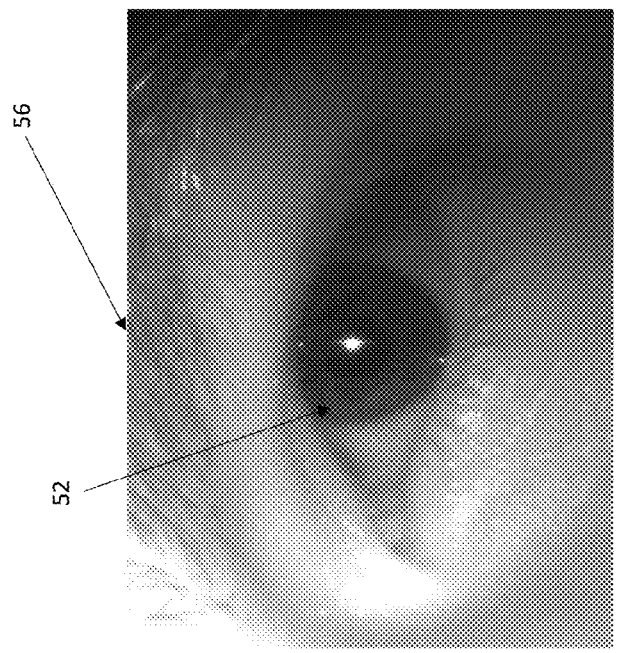

At step 99 enrollment begins with the acquisition of a reference image at a normal exposure time $T_{RN}$ (an exemplary eye region 56 from a normally-exposed reference image is illustrated in FIG. 4). Typically, $T_{RN}$ is sufficiently long to ensure that only a minimum number of pixels within the acquired image are saturated to ensure suitable contrast within the image. Clearly, step 99 may involve the acquisition of as many images as are required until a face comprising an eye region is imaged at a suitable distance from the camera so that the subject is in focus and where subject motion and camera motion are limited so that the eye region contains an iris region 52 in sufficiently clear detail to enable an iris code to be extracted for the subject.

It will therefore be seen that is desirable to acquire the reference image with as short an exposure time $T_{RN}$ as possible to ensure the acquired reference image is sharp.

In order to test whether the acquired reference image is suitable, the enrolment stage can further comprise extracting at least one iris region 52 from the normally-exposed reference image 56, for example using the module 18, step 105, and generating and storing iris information for the extracted iris region(s), using the BAU 20, step 106. If an iris code is successfully extracted and stored, this process can stop, otherwise, a further candidate reference image can be acquired to attempt to extract and store iris information from a reference image.

Figure 5:
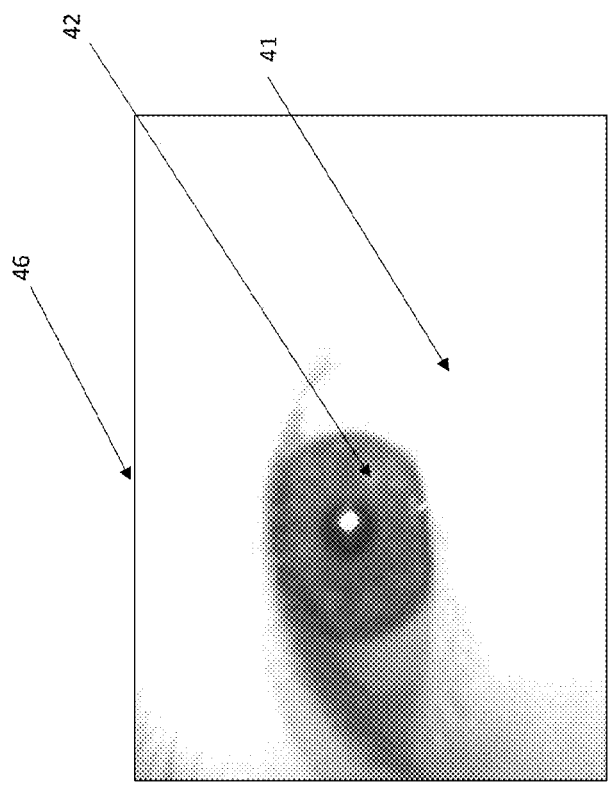
FIGS. 4 and 5 illustrate an iris image acquired with a normal exposure and an overexposure, respectively.

The process continues by acquiring a second reference image where skin portions of the imaged face are saturated, step 100. In the embodiment, step 100 comprises:

deriving a skin map for the reference image, step 100a. There are many techniques for identifying regions of a facial image comprising skin—as compared to eyes, hair, mouth or background. Some of these can comprise performing pattern recognition on an intensity image such as shown in FIG. 4, whereas others might operate on a color version of the IR intensity image where this is available—for example, where an RGB-IR or RGBW image sensor 14 is employed. An example of deriving a skin map of the image under acquisition is disclosed in US2003/0179911, the disclosure of which is incorporated herein by reference, where an image is segmented into regions each of which has a substantially homogeneous color; in particular, regions having a predominantly skin color are mapped;

based on the derived skin map, an exposure time $T_{RO}$ greater than $T_{RN}$ and sufficient to ensure that regions of skin within an image captured for such an exposure time are saturated is derived, step 100b. There are many possible approaches to determining $T_{RO}$, for example:

$$T_{RO}=T_{RN}*K$$

wherein K is the ratio of the pixels saturation level value (255 for an 8-bit pixel) to the lowest intensity value ($I_L$) among the detected skin pixels. On the other hand, in order to prevent outliers unduly affecting the calculation, $I_L$ can be chosen as the maximum intensity level for the n % least bright skin pixels, where n is between 5-25%. In other variations $I_L$ may be chosen as a function of the average or modal intensities of skin pixels within the reference image, and indeed in further variants $T_{RO}$ may be determined independently of $T_{RN}$. Nonetheless, while $T_{RO}$ should be longer than $T_{RN}$ it is important that it is not chosen to be so long that an image captured for that exposure time would be subject to undue camera or subject motion blur. For this reason, enrollment should preferably be performed in a well illuminated environment and/or the illumination source 16 should be sufficient to ensure $T_{RO}$ does not need to be excessive; and acquiring an overexposed reference image during $T_{RO}$, step 100c. An exemplary eye region 46 for such an overexposed image is shown in FIG. 5. Here it will be noted that the skin regions 41 surrounding the eye are largely saturated (white), but also that the details of the iris region 42 acquired from the overexposed image 46 are more visible and readily detectable compared to a normally exposed image such as shown in FIG. 4. As indicated in FIG. 6, if for either reasons of not choosing $T_{RO}$ sufficiently well, either too-long and so causing blur or too short and not sufficiently saturating skin pixels, possibly due to a change in subject conditions, steps 101a-c can be repeated with different exposure times.

The process then continues with the step 101 of detecting whether the eyes regions within the overexposed image 46 acquired at step 100 can be detected.

If so, it indicates that the acquired eye regions belong to a live subject and the enrolment stage can proceed with the execution of steps 102 and 103.

If not, the most likely reason is that a user has presented a facsimile facial image to the camera and as well as the skin regions of the image, the eye regions have also saturated.

It will be appreciated that IR light, especially NIR, is reflected in a different way from the human eye and from the skin of the face of a living person.

The difference in reflection is such that the image acquired while being illuminated by the IR light (preferably, by the NIR light source 16) can be overexposed until saturation of its skin portions, while its eyes regions do not saturate.

For example, FIG. 3 illustrates an acquired NIR image 36 overexposed until its skin portions 31 are saturated, where it is evident how the not-saturated eye regions 30 remain viewable and detectable in contrast to the surrounding saturated skin portions 31.

Comparing FIG. 3 to FIG. 2(b) (illustrating an NIR image acquired with normal exposure and affected by strong sunlight), it is also evident how the iris regions 32 illustrated in FIG. 3 are more readily identifiable and detectable compared to iris regions 32 illustrated in FIG. 2(b). This because the saturation of the skin portions 31 causes a reduction of the sunlight effects, such as the face shadows 33 viewable in FIGS. 2(a) and (b), which affect the eye regions 30.

In this way, the acquisition of the overexposed image 36 improves the iris recognition of the identified iris regions 32, especially in case of strong sunlight.

On the other hand, eye regions from facsimile facial images will tend to saturate in exactly the same way as skin regions and so in an image overexposed for time $T_{RO}$, such regions will tend to saturate and so the entire image will wash out. Eye regions from the normally exposed versions of such images are recognized as belonging to a lifeless subject (step 104) and, at this step enrollment may be interrupted.

On the other hand, if an eye region can be identified within the overexposed image and an iris region can be identified within the eye region, step 102, as explained before in relation to step 105, then the process continues by generating and storing iris information for the extracted iris region(s), using the BAU 20, step 103.

So in summary, the enrollment stage comprises:
acquiring 100 a reference image of a predetermined subject illuminated by an IR illumination source 16, wherein the reference image is overexposed until its skin portion is saturated;
identifying 102 at least one iris region 42 within the acquired overexposed reference image; and
generating 103 and storing information for the identified iris region 42.

Once enrollment is complete, the BAU 20 will ideally have iris information for an overexposed eye region of the subject and, if desired, iris information for a normally exposed eye region of the subject. As indicated above, this reference information can be stored securely in memory 22, within secure memory in the BAU 20 or in any location accessible to the BAU 20.

It will be appreciated however that if ambient light conditions during enrollment are not suitable, it may not be possible to acquire an image with an exposure time $T_{RO}$ long enough to saturate the skin pixels without causing so much blur that an iris code cannot be extracted from the image. In this case, enrollment may be either permitted at least temporarily just based on the normally exposed reference image—or the user may be required to delay enrollment until ambient light conditions are suitable.

Referring now to FIG. 7, the authentication stage starts when a user wishes to either unlock the system or to unlock an application running on the system.

The authentication stage starts by acquiring a probe image of the user normally exposed for exposure time $T_N$, step 198.

At step 199, a decision can be made as to whether or not the device is operating in strong sunlight. One method to do so comprises analyzing the areas around the eyes. If an image is captured indoors, the eyes are properly illuminated and so it is assumed the image has been captured indoors. If an image has been captured outdoors there are shadows 33 around the eyes, such as the examples shown in FIGS. 2(a) and (b). If such shadows 33 are detected, apart from making eye and iris regions difficult to detect, it is assumed that the image has been acquired outdoors in strong sunlight. Another ready indicator which can be used in addition or as an alternative is if $T_N$ is extremely short for example, less than 1/100 ms—if so this suggests that the device is being operated in a well-lit outdoor environment. Other indicators could also be used, such as checking the time of day—it is unlikely that images being acquired between 9 pm and 6 am are being acquired in strong sunlight, or checking device location. For example, GPS coordinates can indicate if a device is located outside in bright conditions or inside under artificially lit conditions. Other indicators include testing whether the device is connected to or detects a WiFi signal—if not there is a good chance the device is outdoors. In any case, where the device is not located outside or in sufficiently well lit conditions, then there is a good chance that the increased time which might be required to saturate skin pixels in the image would be too long to avoid motion blur in an acquired image.

In this case, the process proceeds as normal by:
identifying 206 one or more iris regions within the normally-exposed probe image acquired at step 198; and
analyzing 207 the identified iris regions to detect whether they belong to the predetermined subject. In this case, if steps 105, 106 have been employed in the enrollment stage, then the iris information from the normally exposed reference image for a subject can be used to authenticate the iris region(s) of the normally-exposed image acquired at step 198. If this authentication is successful, the device or application is unlocked and if not, the process might signal a failure to the user and perhaps return to step 198 a maximum limited number of times before permanently locking the device or application.

On the other hand, if at step 199, sunlight is detected, the authentication method 200 proceeds with the execution of steps 201-205. Step 201 comprises:
deriving the skin map (step 201a);
based on the derived skin map, determining a second exposure time $T_O$ greater than $T_N$ (step 201b); and
acquiring an overexposed probe image during $T_O$ (step 201c).

Again, $T_O$ may be determined so as substantially all the skin pixels of an imaged facial region will reach saturation level, as follows: $T_O=T_N \times K$, where K is calculated as in step 100b described above.

Again, the overexposed probe image acquired at step 201c can be checked to determine if it is suitable for iris recognition and if time $T_O$ needs to be adjusted by repeating steps 201a-201c as described in relation to FIG. 6.

Once a suitably overexposed probe image has been acquired, the process continues by detecting whether the overexposed image 36 acquired at step 201 includes one or more eye regions 30, step 202.

If so, it means that the eye regions 30 did not saturate during the overexposed acquisition at step 201, because they reflected the IR light differently from the saturated skin portions 31 and this behavior is associated with live eyes.

Hence, a positive determination at step 202 corresponds to a recognition of liveness of the subject and the method 200 can proceed to steps 203 and 204 to the authentication of the live subject as in steps 206, 207. However, in this case, the iris information from the overexposed probe image acquired at step 100c in enrollment can be used to authenticate the iris region(s) of the overexposed image acquired at step 201c. Preferably, the stored information for the reference iris regions stored at steps 103 and 106 during enrollment comprises an iris code, and steps 204 and 207 comprise comparing an iris code generated from the one or more iris regions identified at step 203 and 206 with the corresponding stored iris code.

A negative determination at step 202 corresponds instead to a lifeless recognition of the subject and this causes authentication to stop and for either the device and/or the application to be locked.

In summary, the authentication stage comprises:
acquiring 201 through the image sensor 14 a probe image illuminated by an IR illumination source 16, wherein the probe image comprises one or more eye regions and is overexposed until its skin portions are saturated;
identifying one or more iris regions within the one or more eye regions; and
analyzing the one or more identified iris regions to detect whether they belong to the predetermined subject.

It will be appreciated that in sufficiently strong sunlight conditions, it might not be necessary to actively illuminate a subject using the IR illumination source 16 when acquiring either the reference or probe images. In such conditions, either the enrollment or authentication process could rely on the IR component of natural sunlight to expose the subject as required. It might only be necessary to determine that the ambient lighting levels were sufficiently high to provide a sufficient IR component for iris exposure to determine that the IR illumination source 16 did not need to be used. Nonetheless, if the eyes were shaded from sunlight, activating the IR illumination source 16 might still be required even in strong sunlight. Thus, the method could be extended to first attempt to acquire an iris image exposed by natural sunlight alone and, if the eyes were shaded in this image, subsequently acquiring an iris image exposed using the IR illumination source 16 (and ambient light) as well as testing for liveness in each case.

It will be appreciated that the above described methods not only improve iris recognition in conditions of strong sunlight, but also advantageously provide robust liveness recognition.

The invention claimed is:

1. An image processing method for iris recognition of a predetermined subject, comprising:
   a) acquiring through an image sensor, a probe image illuminated by an infra-red (IR) illumination source, wherein said probe image comprises one or more eye regions and is overexposed until skin portions of the image are saturated;
   b) identifying one or more iris regions within said one or more eye regions of said probe image; and
   c) analyzing the one or more identified iris regions to detect whether they belong to the predetermined subject.

2. The method according to claim 1, comprising:
responsive to failing to identify one or more iris regions in said probe image, designating said probe image as containing an image of a non-live subject.

3. The method according to claim 1, further comprising enrolling the predetermined subject by:
   identifying a first iris region within a reference image of the predetermined subject illuminated by an IR illumination source, wherein the reference image is overexposed until skin portions of the reference image are saturated; and
   generating and storing information for said identified first iris region.

4. The method according to claim 3 wherein said analyzing comprises: comparing said stored information for the first iris region to information generated from the one or more iris regions of said probe image to determine if said probe image is of said predetermined subject.

5. The method according to claim 4, wherein:
said stored information comprises a first iris code; and
said comparing comprises comparing an iris code generated from the one or more iris regions identified within said probe image to said first iris code.

6. The method according to claim 1, comprising performing steps a), b) and c) in response to ambient light exceeding a threshold.

7. The method according to claim 3 further comprising:
   d) acquiring a normally-exposed probe image, said normally-exposed probe image comprising one or more eye regions;
   e) identifying one or more iris regions within said one or more eye regions of said normally-exposed probe image; and
   f) analyzing the one or more identified iris regions within said normally-exposed probe image to detect whether they belong to the predetermined subject.

8. The method according to claim 7, comprising performing steps d), e) and f) in response to ambient light not exceeding a threshold.

9. The method according to claim 7, wherein enrolling the predetermined subject further comprises:
   identifying a second iris region from a normally-exposed reference image of the predetermined subject illuminated by an IR illumination source; and
   generating and storing information for said identified second iris region.

10. The method according to claim 9 wherein said analyzing step f) comprises: comparing said stored information for the second iris region to information generated from the one or more iris regions of said normally-exposed probe image to determine if said normally-exposed probe image is of said predetermined subject.

11. The method according to claim 7 comprising determining an exposure time for said overexposed probe image as a function of an exposure time for said normally-exposed probe image.

12. The method according to claim 11 wherein said determining an exposure time comprises: identifying skin-pixels within said normally-exposed probe image and determining said exposure time for said overexposed probe image as a function of the intensity values of said skin-pixels.

13. The method according to claim 9 comprising determining an exposure time for said overexposed reference image as a function of an exposure time for said normally-exposed reference image.

14. The method according to claim 1 wherein the step of identifying one or more iris regions is performed responsive to detecting one or more eye regions within said probe image.

15. The method according to claim 1 wherein said IR illumination source comprises one or more of natural sunlight; or an artificial light source.

16. The method according to claim 15 comprising employing said artificial light source in response to determining a degree of shading of eye regions detected in an image of the subject illuminated with only ambient light.

17. An image processing method for iris recognition of a predetermined subject, comprising:
   a) identifying a first iris region from a first reference image of the predetermined subject illuminated by an IR illumination source, wherein said first reference image is overexposed until skin portions of the reference image are saturated;
   b) identifying a second iris region from a second reference image of the predetermined subject acquired under a normal exposure condition; and
   c) generating and storing information for said identified first and second iris regions;

in response to ambient light exceeding a threshold:
- d) acquiring through an image sensor, an image illuminated by an IR illumination source, wherein said image comprises one or more eye regions and is overexposed until skin portions of the image are saturated;
- e) identifying one or more iris regions within said one or more eye regions;
- f) using said stored information for the first iris region for comparing the one or more iris regions identified at step e) to the first iris region; and
- g) detecting, based on the comparison, whether the one or more iris regions identified at step e) belong to said predetermined subject; and in response to ambient light not exceeding a threshold:
- h) acquiring a normally exposed image, said image comprising one or more eye regions;
- i) identifying one or more iris regions within said one or more eye regions;
- j) using said stored information for the second iris region for comparing the one or more iris regions identified at step i) to the second iris region; and
- k) detecting, based on the comparison, whether the one or more iris regions identified at step i) belong to said predetermined subject.

18. An image processing system for iris recognition of a predetermined subject, comprising:
- an optical apparatus which comprises at least an image sensor for acquiring an image and at least one IR illumination source; and
- image processing means arranged for executing the steps of claim 1.

19. A computer program product comprising a non-transitory computer readable storage medium on which instructions are stored which, when executed on an image processing system, are configured for performing the steps of claim 1.

* * * * *